July 16, 1957

F. B. HATEBUR 2,799,027

METHOD OF MAKING WORKPIECES PROVIDED WITH
HEAD AND SHANK, ESPECIALLY SCREW BOLTS

Filed Oct. 23, 1953

INVENTOR
Fritz Bernhard Hatebur

July 16, 1957 F. B. HATEBUR 2,799,027
METHOD OF MAKING WORKPIECES PROVIDED WITH
HEAD AND SHANK, ESPECIALLY SCREW BOLTS
Filed Oct. 23, 1953 2 Sheets-Sheet 2

INVENTOR
Fritz Bernhard Hatebur
By
Patent Agent

United States Patent Office 2,799,027
Patented July 16, 1957

2,799,027

METHOD OF MAKING WORKPIECES PROVIDED WITH HEAD AND SHANK, ESPECIALLY SCREW BOLTS

Fritz Bernhard Hatebur, Basel, Switzerland

Application October 23, 1953, Serial No. 387,927

Claims priority, application Germany October 25, 1952

5 Claims. (Cl. 10—27)

The present invention relates to the making of workpieces provided with head and shank, especially hexagon head screw bolts, by cold working of a blank sheared off from a rod covered with a lubricant layer.

It is an object of this invention to provide an improved method of making workpieces of the above mentioned type which will be considerably more economic than heretofore employed methods for making such workpieces.

It is another object of this invention to provide an improved method of making workpieces having a head and shank, especially screw bolts which will allow making such workpieces without waste while considerably extending the life of the working tools used for the production of such workpieces.

These and other objects and advantages of the invention will appear more clearly from the following specification in connection with the accompanying drawings in which:

Figs. 1 and 1a respectively illustrate a side and end view of a blank sheared off from a rod and having its cylindrical surface covered with a lubricant layer.

Figs. 2 and 2a respectively illustrate a side view and end view of the blank with an upset hexagon head of preliminary shape and with a coined taper.

Figs. 3 and 3a respectively illustrate a side view and end view of the intermediate stage of the workpiece with reduced shank portion and further upset hexagon head of preliminary shape.

Fig. 3b shows the angle of the reducing portion of the working tool.

Figs. 4 and 4a respectively illustrate a side view and end view of the finally calibrated screw bolt with a crest coined thereon and ready for the rolling-in of the thread.

*General arrangement*

The method according to the present invention is characterized primarily by shearing off from a rod covered with a lubricant layer a blank of substantially nominal diameter of the shank of the workpiece, coining or stamping one end of said blank so as to form a cone-shaped reduction or taper, upsetting the other end of said blank so as to form a preliminary shape of the hexagon head with a cross-section smaller than the cross-section of the finished head, forging the thus produced preliminary form or shape of the hexagon head to a hexagon head of intermediate shape which preferably tapers toward the end surface of said head while providing the shank with at least one reduction or taper along its length, and subsequently by at least a further working step finish-upsetting the head portion. If a reduction along the length of the workpiece is provided at the shank end, said reduction must not be smaller than the rolling diameter of the thread later to be provided on the shank portion intended therefor. If desired, the finished workpiece may be annealed or tempered for equalizing any tensions in the workpiece.

It has been found particularly advantageous to upset the hexagon head forms outside the die.

The method according to the invention may preferably be carried out by devices in which the punch or ram for forming the hexagons is composed of two concentric parts of which the respective outer part will form the outer contour of the hexagon head form, while the inner part will form the end surfaces of said hexagon heads, the inner punch or ram portions serving as ejectors. Similarly, the punch or ram for forming the final form of the head may consist of at least two concentric parts of which the outer part will form the bolt head surfaces to be engaged by a wrench, while the inner part will form the end surfaces of the final head, the inner punch or ram portion serving as ejector. The front portion of the inner punch or ram part may instead of having a hexagon form also be cylindrical with a diameter equaling the diameter of the circle inscribed into the screw head hexagon.

*Structural arrangement*

In order economically to produce a bolt with hexagon head while avoiding any waste and while reducing the wear of the working tools, without regard to tensions which may occur between the head and the shank, the method according to the present invention is preferably carried out by means of a plural step transverse transport press of any conventional design.

Figure 1A:
Figure 1:
Figure 2A:
Figure 2:
Figure 3A:
Figure 5:
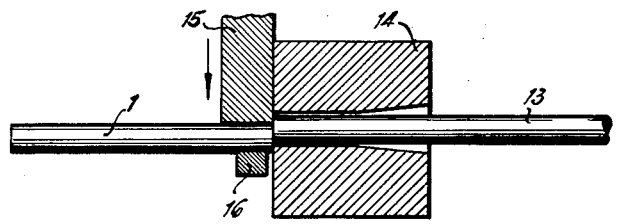
Fig. 5 is a diagrammatic cross-section through the shearing device for shearing off the blank.
Figure 6:
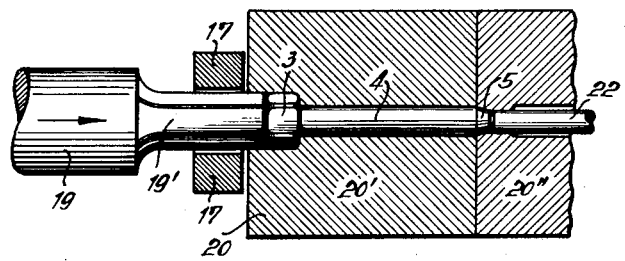
Fig. 6 represents a diagrammatic cross-section through the working tool for upsetting the hexagon head of preliminary shape and for coining on the taper.
Figure 7:
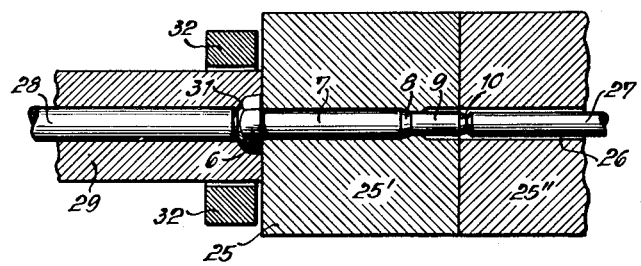
Fig. 7 illustrates a diagrammatic cross-section through the working tool for further upsetting the hexagon head of preliminary form and for reducing or tapering the shank.

First a blank of the desired length is sheared off by a shearing device 14, 15, 16 (Fig. 5) from a rod 13 covered in a manner known per se with a lubricant, for instance a phosphate layer 2. During the first forming step, the thus sheared off blank has one end thereof stamped or coined in such a manner that it will form a cone-shaped reduction or taper 5. The other end of said blank is upset (Figs. 2 and 6) in such a manner as to form a hexagon preliminary head 3 with more or less rounded edges. The head-forming portion of the female die 20' may, if no resilient head punch is employed, be provided with a slight taper tapering toward the punch side in order to facilitate the ejection from the die. The end surface of the punch or ram 19' which is perpendicular to the axis of the blank, as well as the end surface of the ejector mandrel 22 likewise perpendicular to the axis of the mandrel will during the shaping of the blank in the first pressing tool 20 take care of the leveling of the blank ends deformed during the shearing cut. In the die 20" the section or blank 1 has coined thereto a short cone-shaped portion 5 which later will form the tip of the bolt. The angle α of the cone-shaped work tool portion (Fig. 2) for forming the taper 5 may be somewhat larger than the reducing angle β of the die portion 25' of the subsequent tool 25 (Figs. 3b and 7) so that in the subsequent tool 25 the sheared surface of the blank which is not provided with a lubricant layer has passed through the reducing portion or reducing taper when the blank 3, 4, 5 shaped in the tool 20 contacts the reducing section by means of its fully effective lubricant layer provided on the cylindrical surface of said blank. Any burrs which might have formed during the shearing cut will during the shaping of the blank in the work tool 20 in a solidly contracting manner be pressed into the blank end surface by means of the cone-shaped formation of the die portion 22' and by means of the supporting and ejector pin 22. During the ejecting step, the preformed blank will be gripped by the jaws 17 and will automatically be conveyed to the second working tool 25 (Fig. 6).

The second pressing or working tool 25 is shaped similar to the first pressing or working tool, in other words has a die which preferably also comprises two parts. The front part 25' comprises the reducing portion or taper 8 (Figs. 3b and 7) whereas the rear part 25 serves merely by means of its bore 26 for receiving the reduced or tapered shank portion 9 of the intermediate stage workpiece and for guiding the ejector pin 27. The punch or ram is preferably composed of two parts. In the hollow part 29 surrounding the intermediate ejector 28 there is provided the hexagon form for preparing the intermediate stage form of the screw bolt head. In the second pressing or working tool 25, the shank 4 of the shaped blank is partly reduced to the shank portion 9. The reducing portion or taper 8 of the die reduces safely only such portion of the shank 4 of the preshaped blank which has a fully maintained and therefore fully effective lubricant layer.

Figure 3:
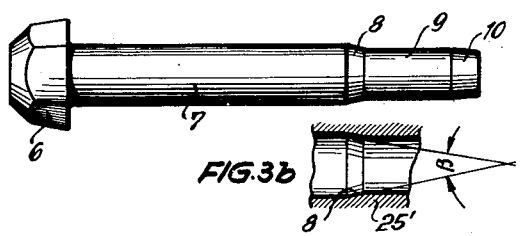

In addition thereto, simultaneously the head preform 3 (Figs. 2 and 6) is pressed to a pyramid-shaped hexagon intermediate stage form 6 (Figs. 3 and 7) with sharp contours and an excessive bevel. The head punch 29 of the tool first presses by means of its slant cone-shaped surface 31 upon the head preform 3 which was formed during the preceding step. As soon as the head bearing surface of the shaped blank 3, 4, 5 contacts the end surface of the die portion 25', two component effects are produced, namely first the component perpendicular to the cone surface of the punch, and second the components perpendicular to the pyramid-shaped surfaces being formed of the head which are to be contacted by the wrench. The points of intersection of said components are still located in the head so that even an increased forging pressure cannot press any material out of the head into the shank with the known harmful results inherent thereto. The shaping of the head is intentionally produced by the punch and not, as heretofore customary carried out in the die. The advantage of this arrangement consists in that the ejection of the reduced or tapered shank is easily effected without again upsetting the shank portion behind the taper. By shaping the head in the punch, the intermediate stage workpiece is by the retraction of the punch practically pulled out of the die. The ejector 28 provided in the punch will take care of a smooth ejection from the punch 29 if the bolt should for some reason stick to the retracting punch 29. When designing the device as transverse transport press, the jaws 32 may, therefore, safely grasp the bolt while a hard and sudden ejection as it is almost always the case with dies comprising the head shaping portion, is avoided by the design of the working tools according to the invention.

Figure 4A:
Figure 4:
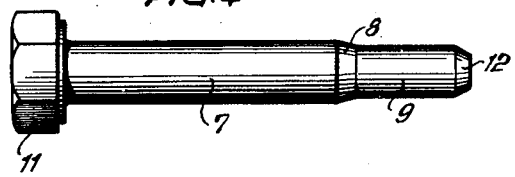
Figure 4:
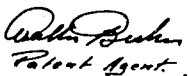
Figure 8:
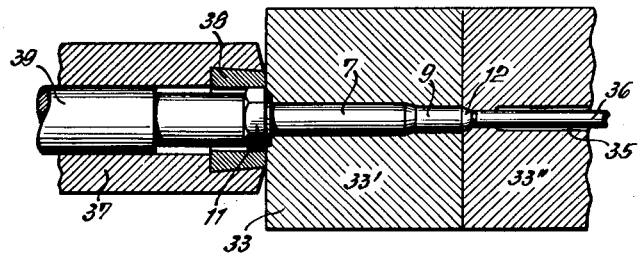
Fig. 8 is a diagrammatic cross-section through the finish-form working tool for calibrating the screw bolt.

The jaws 32 convey the workpiece to the last working tool where it is finished. The working tool 33 preferably comprises again a two part die (Fig. 8). The front die portion 33' primarily serves only to smooth the shank portions 7 and 9 and to form a round head supporting disc below the hexagon head. The rear die portion 33" comprises a cone-shaped stamping form for forming a crest or dome-shaped tip 12. Said cone-shaped pressing form merges into a bore 35 for the ejector pin 36. The punch likewise consists of two parts. The outer hollow part 37 carries a calibrating tool 38 for those surfaces of the bolt head which are to be engaged by the wrench, whereas the central portion 39 is adapted to shape the head from its intermediate stage form 6 into the finished form 11. During the last working step, the shank 7 and the shank portion 9 are merely smoothingly calibrated. A short cone-shaped crest 12 is simultaneously stamped to form the tip of the finished bolt (Fig. 4).

A pressure upon the end surface of the pyramid-shaped intermediate stage head 6 forges said head to its final height, while the bevel of the normal or standard final head 11 forms in free flow without being touched by the working tool. The shaping of the head is again intentionally carried out in the punch. In this instance the punch during its return stroke effectively pulls the bolt out of the die. The ejector mandrel 36 in the die portion 33" is provided merely as a kind of safety or reserve member. It will thus be evident from the above that the new method according to the present invention makes it possible from rod sections of approximately the nominal diameter of the finished bolts to prepare hexagon head screw bolts without any waste while simultaneously obtaining a considerably reduced stress at the tapered portions of the bolt shanks. By stamping or coining a taper on rod sections of approximately nominal diameter of the finished bolts, it will be obtained that only blank surfaces properly covered with lubricants and therefore fully effective will with sliding deformation come into contact with the working edges of the working tools. The life of the tools is thereby considerably increased. In connection with the saving in material by a chipless deformation of the head, the economy of cold worked screws is considerably improved.

If desired, the workpiece produced in this manner and without waste may subsequently be tempered or annealed either after or preferably prior to providing the shank with a thread for instance by thread rolling. In this way any tensions produced during the cold upsetting between the head and the shank will be equalized.

It is, of course, understood that the present invention is, by no means, limited to the particular method and device described with reference to the accompanying drawings but also comprises any modifications within the scope of the appended claims.

What I claim is:

1. A method of making a workpiece having a polygonal head and a shank from a blank cut off from round stock, which includes the steps of: upsetting one end of said round blank into a preliminary polygonal head having a cross-section larger than the diameter of the adjacent blank portion but smaller than the cross-section of the desired finished head, further upsetting the thus formed preliminary head to produce a tapered intermediate stage polygonal head tapering toward the top of said intermediate stage head and at the same time reducing the cross-sectional size of the upper end of the preliminary head to form a preliminary chamfer at the outer end of said intermediate stage head, and subsequently finish upsetting the said intermediate stage head into its final shape while simultaneously flattening out said chamfer.

2. A method of making a workpiece having a polygonal head and a shank from a blank cut off from round stock, which includes the steps of: upsetting one end of said round blank into a preliminary polygonal head having a cross-section larger than the diameter of the adjacent blank portion but smaller than the cross-section of the desired finished head, further upsetting the thus formed preliminary head while simultaneously reducing the cross-sectional size of the upper end thereof to form a tapered intermediate stage having a first portion of tapered polygonal shape adjacent said shank and having an outer portion of frusto-conical shape, said first portion tapering toward said outer portion, and subsequently finish upsetting the said intermediate stage head into its final shape while simultaneously flattening out said chamfer.

3. A method of making a workpiece having a polygonal head and a shank from a blank cut off from round stock, which includes the steps of upsetting one end of said round blank into a preliminary polygonal head having a cross-section larger than the diameter of the adjacent blank portion but smaller than the cross-section of the desired finished head, while simultaneously pressing the other end of said blank into a taper, further upsetting the thus formed preliminary head while simultaneously reducing the cross-sectional size of the upper end thereof to form a tapered intermediate stage having a first portion of tapered polygonal shape adjacent said shank and having an outer portion of frusto-conical shape, said first portion tapering toward said outer portion, and subsequently finish upsetting the said intermediate stage head into its final shape while simultaneously flattening out said chamfer.

4. A method of making a workpiece having a polygonal head and a shank from a blank cut off from round stock and having a diameter substantially equaling the largest shank diameter of the finished workpiece, which includes the steps of: upsetting one end of said round blank into a preliminary polygonal head having a diameter larger than the diameter of the adjacent blank portion but smaller than the cross section of the desired finished head while positively delimiting the final size of said preliminary head, further upsetting the thus formed preliminary head while simultaneously reducing the cross-sectional size of the upper end thereof to form a tapered intermediate stage polygonal head adjacent said shank with a preliminary chamfer at the outer end of said intermediate stage head, said polygonal head and said preliminary chamfer tapering toward the outer end of said head, and subsequently finish upsetting the said intermediate stage head into its final shape while positively delimiting the final size of the head being formed, and flattening out said chamfer.

5. A method of making a workpiece having a polygonal head and a shank from a blank cut off from round stock, which includes the steps of: upsetting one end of said round blank into a preliminary polygonal head having a cross-section larger than the diameter of the adjacent blank portion but smaller than the cross-section of the desired finished head, further upsetting the thus formed preliminary head to produce a tapered intermediate stage polygonal head tapering toward the top of said intermediate stage head and at the same time by reducing the cross-sectional size of the upper end of the preliminary head to form a preliminary chamfer at the outer end of said intermediate stage head, and subsequently finish upsetting the said intermediate stage head into its final shape while simultaneously flattening out said chamfer, the tapering surface of said polygonal head and the surface defining said chamfer intersecting each other at an obtuse angle so that the force components of the upsetting forces acting perpendicular to and upon said surfaces intersect each other within said head thereby compressing the material of the head during the shaping operation of the latter totally within said head whereby the quantity of the material of the head remains the same during the entire shaping process of said head.

References Cited in the file of this patent
UNITED STATES PATENTS

| | | |
|---|---|---|
| 873,750 | Hopkins | Dec. 17, 1907 |
| 1,026,082 | Duston | May 14, 1912 |
| 1,255,504 | Blakeslee | Feb. 5, 1918 |
| 1,617,122 | Kaufman | Feb. 8, 1927 |
| 1,778,562 | Noble | Oct. 14, 1930 |
| 1,909,553 | Schermer et al. | May 16, 1933 |
| 2,036,758 | Johnson | Apr. 7, 1936 |
| 2,102,941 | Cabwallader | Dec. 21, 1937 |
| 2,124,022 | Alberts | July 19, 1938 |
| 2,287,214 | Wilcox | June 23, 1942 |
| 2,716,759 | Merlin | Sept. 6, 1955 |